United States Patent
Geens et al.

(10) Patent No.: US 11,624,887 B2
(45) Date of Patent: Apr. 11, 2023

(54) FIBER MANAGEMENT FOR PIVOTABLE TRAYS HAVING FIBER GUIDES SPACED APART FROM HINGES

(71) Applicant: COMMSCOPE CONNECTIVITY BELGIUM BVBA, Kessel-Lo (BE)

(72) Inventors: Johan Geens, Bunsbeek (BE); Roger Alaerts, Aarschot (BE); Pieter Vermeulen, Westerlo (BE); Eric Marcel M. Keustermans, Houwaart (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 17/853,231

(22) Filed: Jun. 29, 2022

(65) Prior Publication Data
US 2022/0326464 A1 Oct. 13, 2022

Related U.S. Application Data

(63) Continuation of application No. 17/149,292, filed on Jan. 14, 2021, now Pat. No. 11,385,430, which is a (Continued)

(51) Int. Cl.
*G02B 6/44* (2006.01)
(52) U.S. Cl.
CPC ......... *G02B 6/4455* (2013.01); *G02B 6/4453* (2013.01); *G02B 6/4454* (2013.01)
(58) Field of Classification Search
CPC .. G02B 6/4455; G02B 6/4453; G02B 6/4454; G02B 6/44
See application file for complete search history.

(56) References Cited

U.S. PATENT DOCUMENTS

| 5,249,252 A | 9/1993 | Noto |
| 6,009,225 A | 12/1999 | Ray et al. |

(Continued)

FOREIGN PATENT DOCUMENTS

| DE | 92 17 305 U1 | 3/1993 |
| EP | 2 381 283 A1 | 10/2011 |

(Continued)

OTHER PUBLICATIONS

International Search Report and Written Opinion of the International Searching Authority for corresponding International Patent Application No. PCT/EP2016/078683 dated Jan. 30, 2017, 9 pages.

*Primary Examiner* — Andrew Jordan
(74) *Attorney, Agent, or Firm* — Merchant & Gould P.C.

(57) ABSTRACT

An optical fiber management system (10) includes a telecommunications fixture (14) and a telecommunications tray (16) pivotally mounted to the telecommunications fixture (14) via a hinge structure (18) positioned at an edge (22) of the tray (16). At least one end (24) of the tray edge (22) that is spaced from the hinge structure (18) defines a fiber guide (26) having a generally cylindrical configuration with open ends (28) for guiding fibers in and/or out of the tray (16). The fiber guide (26) is nested within a reinforcement channel (46) defined by a generally U-shaped wall (48) of the telecommunications fixture (14), the U-shaped wall (48) defining opposing vertical wall portions (50) for abutting the cable guide (26) of the tray (16) for retaining the cable guide (26) within the reinforcement channel (46) during pivotal movement of the tray (16).

15 Claims, 7 Drawing Sheets

Related U.S. Application Data continuation of application No. 16/426,596, filed on May 30, 2019, now Pat. No. 10,895,704, which is a continuation of application No. 15/779,016, filed as application No. PCT/EP2016/078683 on Nov. 24, 2016, now Pat. No. 10,310,207.

(60) Provisional application No. 62/260,073, filed on Nov. 25, 2015.

(56) References Cited

U.S. PATENT DOCUMENTS

| | | | |
|---|---|---|---|
| 6,427,045 | B1 | 7/2002 | Matthes et al. |
| 7,856,166 | B2 | 12/2010 | Biribuze et al. |
| 10,310,207 | B2 | 6/2019 | Geens et al. |
| 10,539,757 | B2 * | 1/2020 | Ruiz .................... H04Q 1/025 |
| 11,042,001 | B2 * | 6/2021 | Ruiz .................... G02B 6/4452 |
| 11,340,416 | B2 * | 5/2022 | Geens .................. G02B 6/4452 |
| 2003/0202765 | A1 | 10/2003 | Franklin et al. |
| 2004/0175090 | A1 | 9/2004 | Vastmans et al. |
| 2006/0029351 | A1 | 2/2006 | Lapp |
| 2008/0226250 | A1 | 9/2008 | Gonzales et al. |
| 2008/0310811 | A1 | 12/2008 | Gonzales et al. |
| 2010/0061693 | A1 | 3/2010 | Bran de Leon et al. |
| 2013/0170810 | A1 | 7/2013 | Badar et al. |
| 2013/0209049 | A1 | 8/2013 | Kowalczyk et al. |
| 2015/0253528 | A1 | 9/2015 | Corbille et al. |
| 2016/0147030 | A1 | 5/2016 | Kowalczyk et al. |
| 2017/0363831 | A1 | 12/2017 | Cornelissen et al. |
| 2018/0348463 | A1 | 12/2018 | Geens et al. |
| 2019/0124421 | A1 * | 4/2019 | Ruiz .................... G02B 6/4455 |
| 2019/0170961 | A1 | 6/2019 | Coenegracht et al. |
| 2019/0346647 | A1 | 11/2019 | Geens et al. |
| 2020/0033546 | A1 | 1/2020 | Geens et al. |
| 2020/0064576 | A1 | 2/2020 | Pilon et al. |
| 2020/0150370 | A1 | 5/2020 | Van Baelen et al. |
| 2020/0225434 | A1 * | 7/2020 | Ruiz .................... G02B 6/4452 |
| 2020/0264396 | A1 | 8/2020 | Cornelissen et al. |
| 2020/0325712 | A1 * | 10/2020 | Ruiz .................... H04Q 1/021 |
| 2021/0103114 | A1 * | 4/2021 | Claessens ............ G02B 6/4455 |
| 2021/0208354 | A1 | 7/2021 | Geens et al. |
| 2021/0271045 | A1 * | 9/2021 | Geens .................. G02B 6/4477 |
| 2021/0311277 | A1 * | 10/2021 | Ruiz .................... H04Q 1/025 |
| 2022/0326464 | A1 * | 10/2022 | Geens .................. G02B 6/4453 |

FOREIGN PATENT DOCUMENTS

| | | |
|---|---|---|
| ES | 2 544 203 A2 | 8/2015 |
| FR | 2 793 564 A1 | 11/2000 |
| GB | 2 312 053 A | 10/1997 |
| WO | 94/23324 A1 | 10/1994 |
| WO | 2004/110122 A2 | 12/2004 |
| WO | 2014/091371 A1 | 6/2014 |
| WO | 2014/173930 A1 | 10/2014 |

* cited by examiner

FIBER MANAGEMENT FOR PIVOTABLE TRAYS HAVING FIBER GUIDES SPACED APART FROM HINGES

CROSS-REFERENCE TO RELATED APPLICATION

This application is a Continuation of U.S. patent application Ser. No. 17/149,292, filed on Jan. 14, 2021, now U.S. Pat. No. 11,385,430; which is a Continuation of U.S. patent application Ser. No. 16/426,596, filed on May 30, 2019, now U.S. Pat. No. 10,895,704; which is a Continuation of U.S. patent application Ser. No. 15/779,016, filed on May 24, 2018, now U.S. Pat. No. 10,310,207; which is a National Stage Application of PCT/EP2016/078683, filed on Nov. 24, 2016, which claims the benefit of U.S. Patent Application Ser. No. 62/260,073, filed on Nov. 25, 2015, the disclosures of which are incorporated herein by reference in their entireties. To the extent appropriate, a claim of priority is made to each of the above disclosed applications.

BACKGROUND

Optical fiber distribution systems may include equipment such as trays that are mounted in telecommunications closures, wherein the trays may house fiber terminations in the form of splices or splitters. Such trays may be provided as pivotable trays that can be flipped for access to the trays. Various concerns exist for such optical fiber distribution systems, including management and guidance of optical fibers entering and exiting the trays. When such trays are pivotally mounted to the telecommunications closures via hinges that are positioned toward the center of the tray edge, the ends of the tray edge may experience a certain amount of deflection and bending during the pivotal movement of the trays. Such deflection may eventually result in warping of the trays. If optical fibers of a system are entering or exiting the trays at those portions that have undergone deflection/warping (such as ends spaced from the hinged part of the trays), fiber breakage becomes a concern at those portions due to misalignment of parts and excessive bending of the fibers.

Improvements in fiber management/guidance in flip trays are desired.

SUMMARY

Some aspects of the disclosure are directed to an optical fiber management system for flip trays that are mounted to telecommunications fixtures such as telecommunications enclosures, wherein such an optical fiber management system is designed to limit deflection of certain parts of the trays to limit breakage of fibers that are exiting or entering the trays at those portions.

According to one aspect, the disclosure is related to an optical fiber management system that includes a telecommunications fixture and a telecommunications tray pivotally mounted to the telecommunications fixture via a hinge structure positioned at an edge of the tray. At least one end of the tray edge that is spaced from the hinge structure defines a fiber guide having a generally cylindrical configuration with open ends for guiding fibers in and/or out of the tray. The fiber guide is nested within a reinforcement channel defined by a generally U-shaped wall of the telecommunications fixture, the U-shaped wall defining opposing vertical wall portions for abutting the cable guide of the tray for retaining the cable guide within the reinforcement channel during pivotal movement of the tray.

According to another aspect, the disclosure is directed to a flip tray for pivotal mounting in a telecommunications fixture, the flip tray configured for housing optical fibers, the tray comprising a hinge structure positioned along an edge of the tray for pivotal mounting to the fixture and a pair of fiber guides positioned at outer ends of the tray edge spaced from the hinge structure, each fiber guide defining a generally cylindrical configuration with open ends for guiding fibers in and/or out of the tray, wherein longitudinal axes defined by the fiber guides are generally parallel to a pivotal axis of the hinge structure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Optical fiber distribution systems may include equipment such as trays that are mounted in telecommunications fixtures such as telecommunications enclosures (e.g., pull-out drawers, etc.), wherein the trays may house fiber terminations in the form of splices or splitters. Such trays may be provided as pivotable trays that can be flipped for access to the trays.

One concern regarding such flip trays relates to the deflection of certain parts of the trays when the trays are being pivotally moved. For example, according to one example, if a tray is pivotally mounted to the telecommunications enclosures via a hinge structure that is positioned nearer to the center of the tray edge, the ends of the tray edge may experience a certain amount of deflection and bending during the pivotal movement of the tray. Such deflection may eventually result in warping of the trays. If optical fibers of a system are entering or exiting the trays at portions that either undergo deflection or have undergone warping, fiber breakage becomes a concern at those portions due to misalignment of parts and excessive bending of the fibers.

Figure 1:
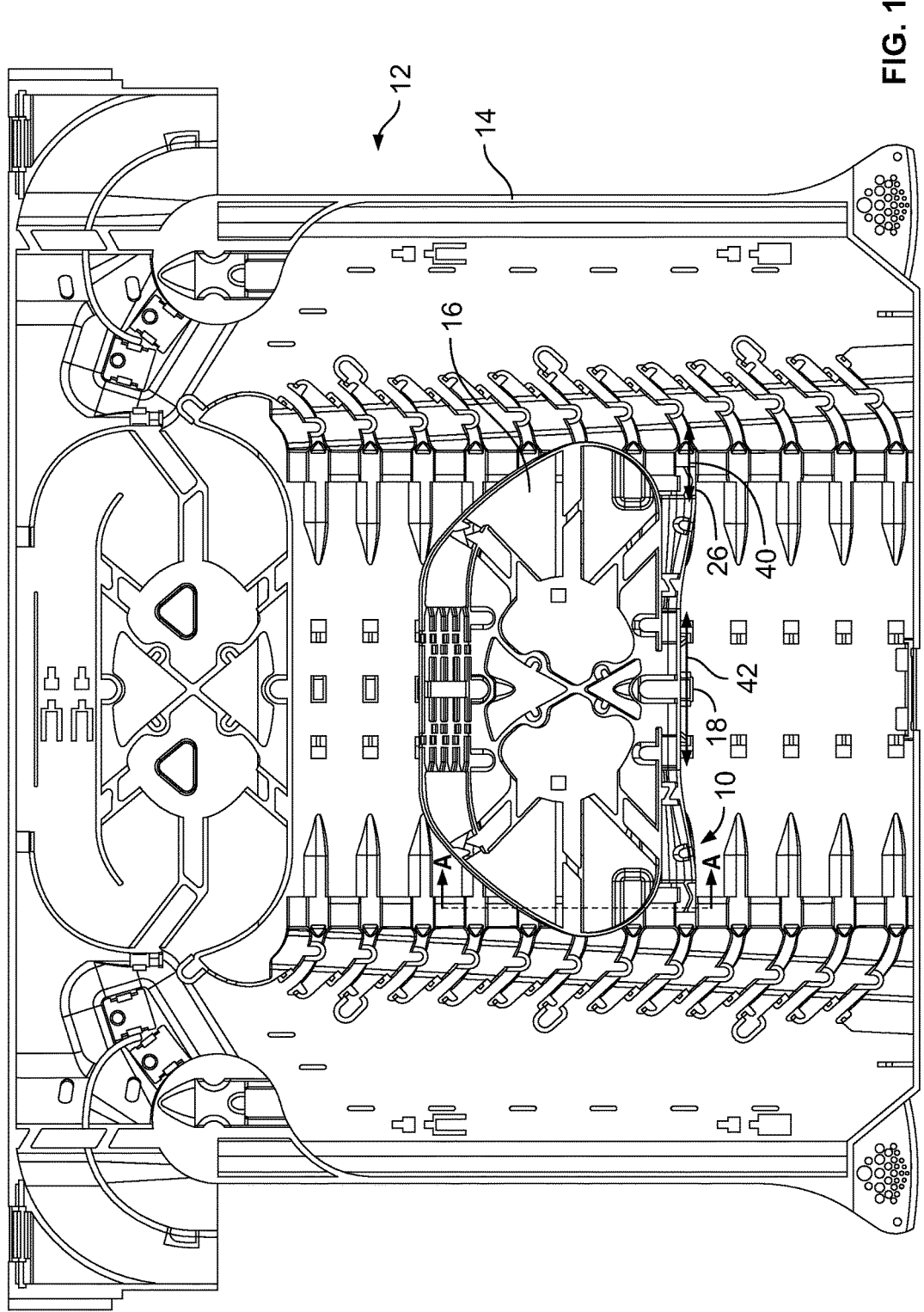
FIG. 1 is a top view of an optical fiber distribution system including a telecommunications fixture with a flip tray configured to contain fiber optic splices and/or splitters, wherein the fixture and the tray cooperately form an optical fiber management system having examples of inventive aspects in accordance with the present disclosure that is used for guiding optical fibers entering and exiting the flip tray.
Figure 2:
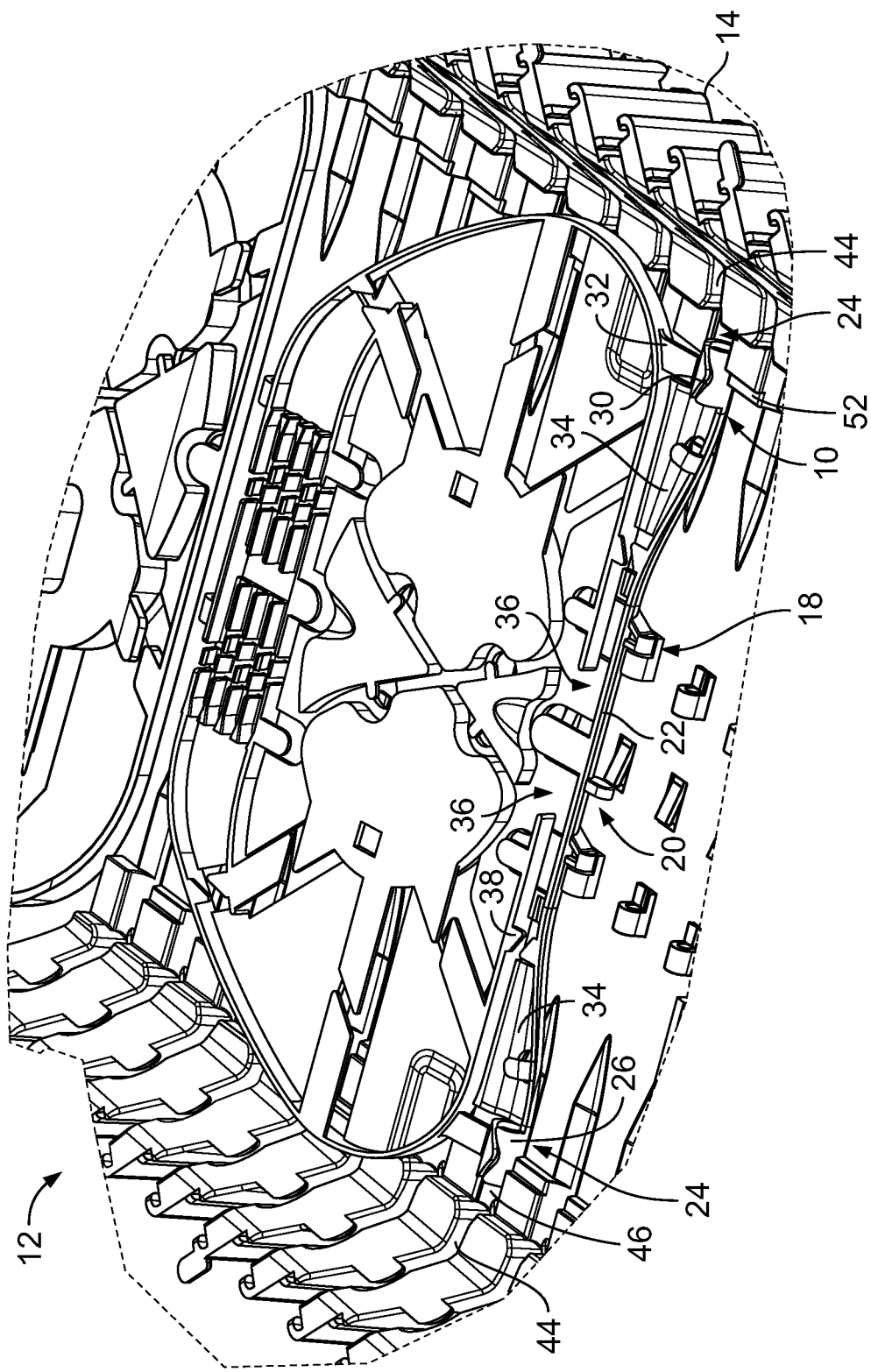
FIG. 2 is a perspective view of a portion of the optical fiber distribution system of FIG. 1.
Figure 3:
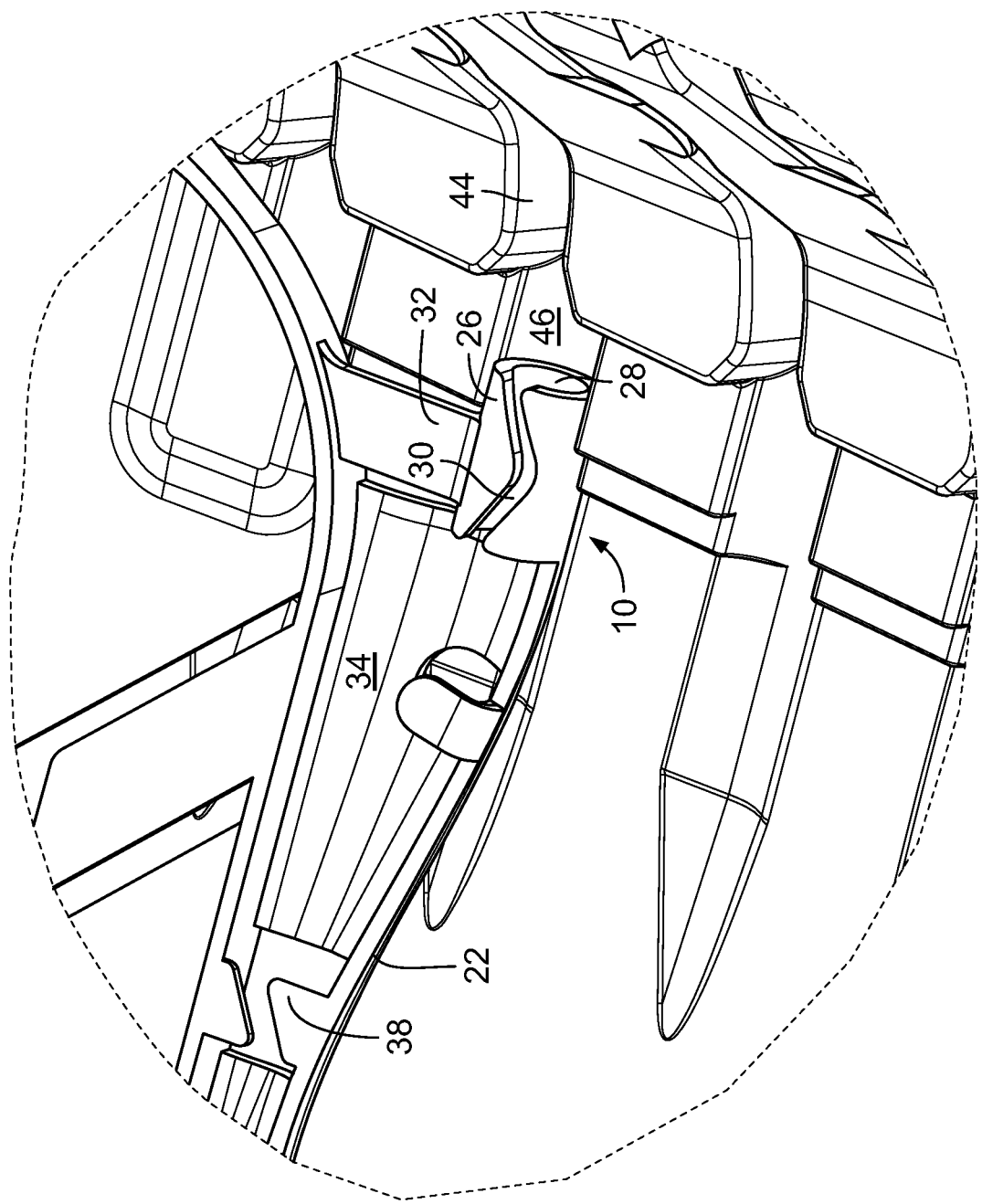
FIG. 3 is a close-up perspective view of the optical fiber management system of FIGS. 1 and 2 that is used for guiding optical fibers entering and exiting the flip tray.
Figure 4:
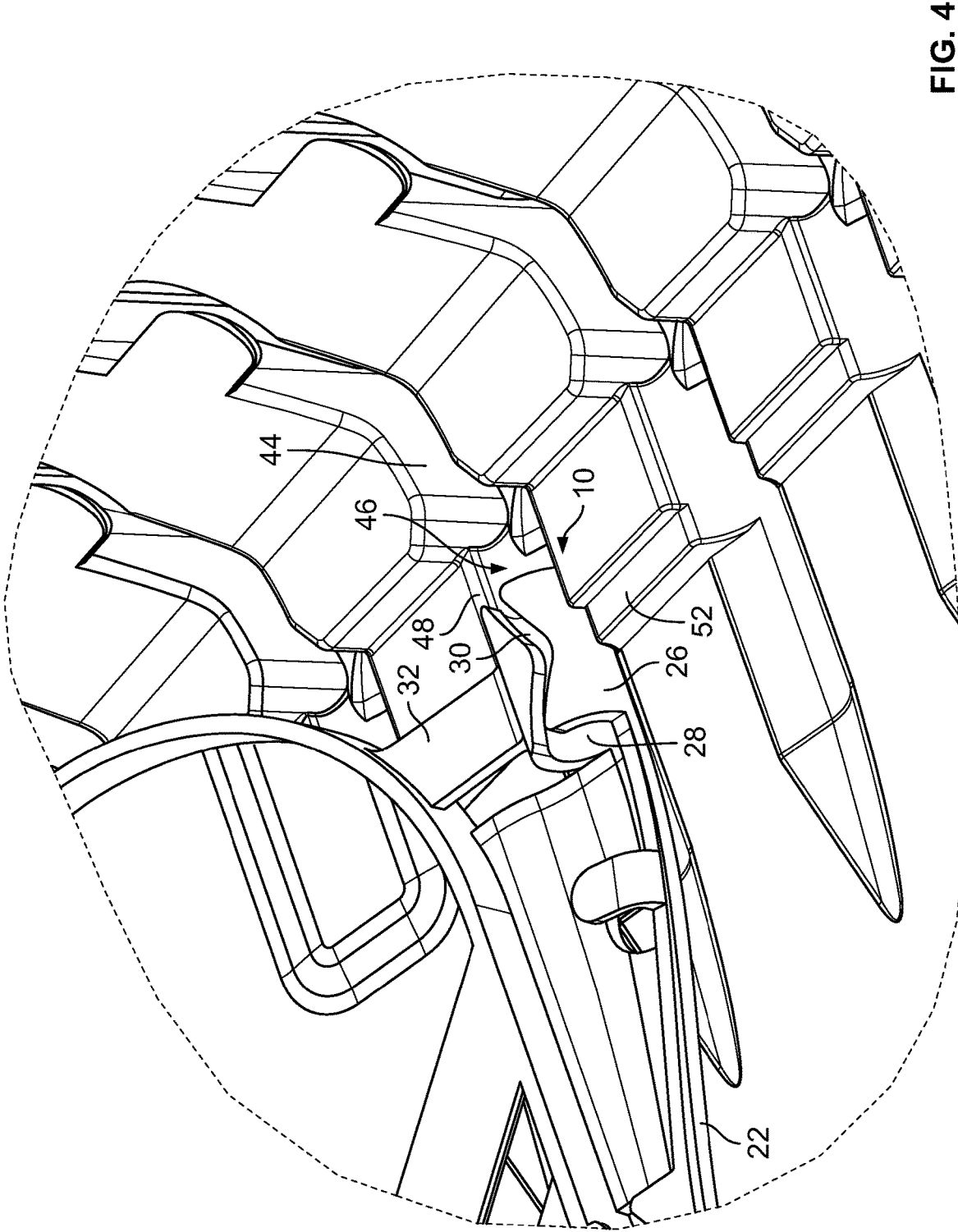
FIG. 4 is another close-up perspective view of the optical fiber management system of FIG. 3.
Figure 5:
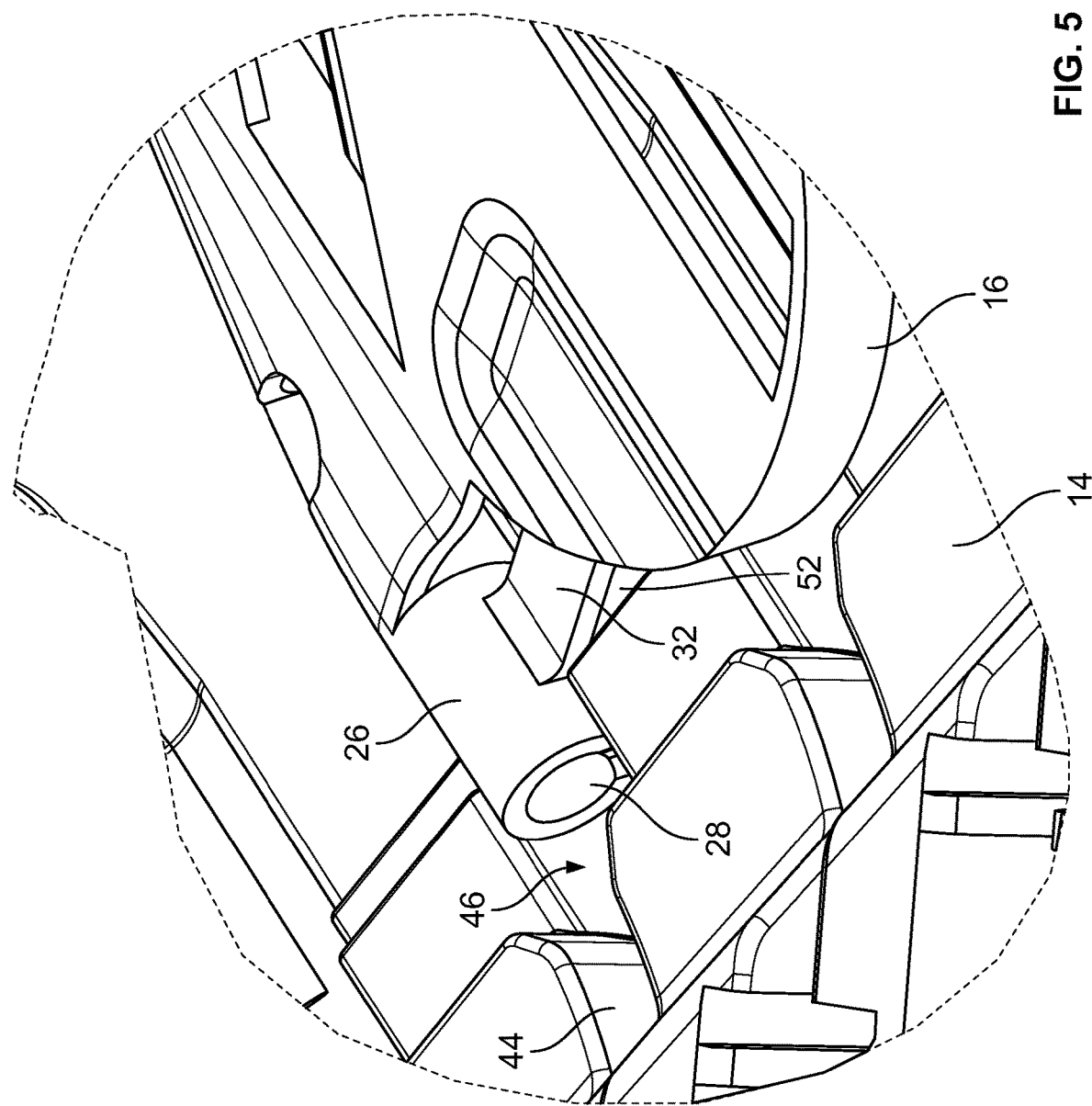
FIG. 5 is a perspective view illustrating the underside of the optical fiber management system of FIGS. 3-4 when the tray is in the flipped configuration.
Figure 6:
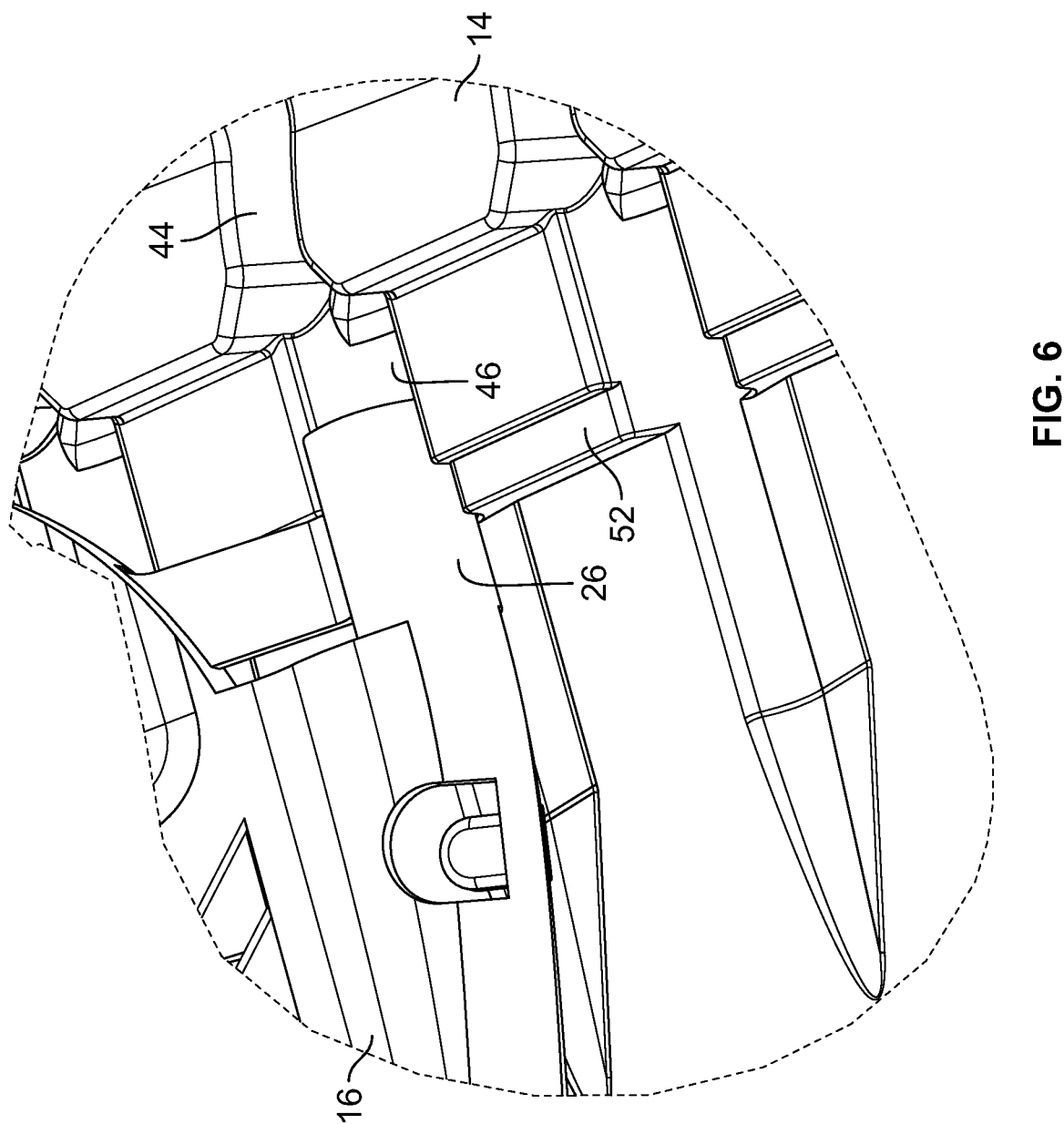
FIG. 6 is another perspective view illustrating the underside of the optical fiber management system of FIG. 5.
Figure 7:
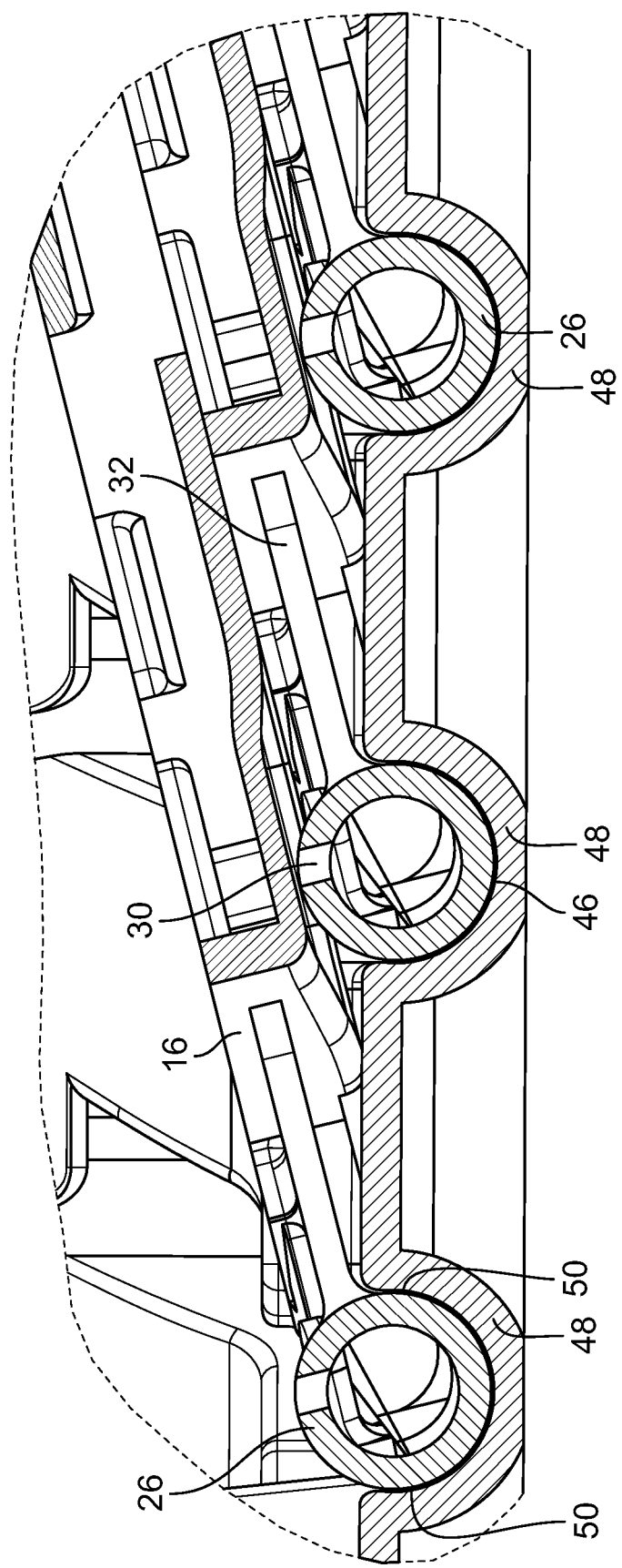
FIG. 7 is a cross-sectional view of the optical fiber management system of FIGS. 1-6 shown being provided on a plurality of trays mounted on a telecommunications fixture, wherein the cross-section is taken along a line similar to line A-A of FIG. 1.

Referring now to FIGS. 1-7 in general, an optical fiber management system 10, having features that are examples of inventive aspects in accordance with the disclosure, is shown. As will be discussed in further detail, the fiber management system 10 is designed to limit deflection of certain parts of flip trays to limit breakage of fibers that are exiting or entering the trays at those portions. The fiber management system 10 is configured to limit those portions of the tray that are guiding fibers in and out of the tray from excessive deflection and warping. In this manner, those portions of the tray that are guiding fibers can stay aligned with other portions of the fixture to which the tray is mounted to provide a smooth fiber path, without the fibers experiencing excessive bending.

Still referring to FIGS. 1-7, in an example optical fiber distribution system 12, a telecommunications fixture in the form of an enclosure 14 may include a plurality of flip trays 16 (one shown) containing fiber optic splices. Splitters can also be provided if desired. The trays 16 are pivotally mounted to the fixture 14 to allow flipping of the trays 16 for access to the interiors of the trays 16.

As shown, each tray 16 is pivotally mounted to the fixture 14 via a hinge structure 18 that is cooperatively formed by the fixture 14 and the tray 16. Portions of the hinge structure 18 that are located on the tray 16 are positioned closer to the center 20 of the tray edge 22. Thus, a tray such as the tray 16 shown in FIGS. 1-7, without the inventive optical fiber management system 10 of the present disclosure, may experience some deflection at the outer ends 24 of the tray edge 22 when the tray 16 is pivotally moved. Since a user may tend to grab the tray 16 at one of its longitudinal ends for the pivotal motion, the tray 16 may experience some torqueing or a bending moment that is spaced away from the hinge structure 18. As noted above, if a fiber or a plurality of fibers are entering and exiting the tray 16 at portions that experience the deflection, fiber breakage may eventually become a concern due to misalignment of parts and excessive bending forces on the fibers.

In the optical fiber distribution system 12 of the present disclosure, the telecommunications fixture 14 and each tray 16 cooperatively form the inventive optical fiber management system 10 of the present disclosure. As shown, each tray 16 defines a fiber guide 26 positioned at the outer ends 24 of the tray edge 22. In the depicted embodiment, each fiber guide 26 is generally of a cylindrical configuration with open ends 28 in the form of a split-ring. The fiber guide 26 defines a slit 30 for inserting/removing fibers in a direction transverse to the open ends 28. Each fiber guide 26 is also connected to the main tray body via neck portion 32.

In the given embodiment, each fiber guide 26 is configured to lead fibers to and from a fiber entry/exit area/channel 34 that leads to fiber entry/exit points 36 in the tray 16. The channel 34 is defined by a plurality of fiber management fingers 38 that are configured to retain the fibers within the channel 34. Once the fibers enter the tray 16, the fibers can be lead to different areas for processing (i.e., splicing, splitting, etc.).

The fiber guide 26 is configured to define a longitudinal axis 40 that is generally parallel to a longitudinal/pivotal axis 42 defined by the hinge structure 18. According to the given embodiment, the longitudinal axis 40 of the fiber guide 26 is aligned with that of the hinge structure 18 to minimize the amount of movement for the fibers that are entering or exiting the tray 16.

According to the present disclosure, the fiber guides 26 of the tray 16 form a part of the optical fiber management system 10. The other part of the optical fiber management system 10 is defined by the telecommunications fixture 14. As shown, the telecommunications fixture 14 that houses the flip trays 16 defines a plurality of cable exit or entry channels 44 that are provided in a stacked arrangement. Each fiber guide 26 is configured to guide the fibers of the tray 16 toward the channels 44. A portion of each of the channels defines a reinforcement portion or reinforcement channel 46. The reinforcement channel 46 is defined by a U-shaped wall 48 that is configured to partially envelop the fiber guides 26 of the trays 16 and limit deflection of the fiber guides 26. As shown in the cross-sectional view of FIG. 7, each U-shaped wall 48 defines opposing vertical wall portions 50 that abut the fiber guides 26 and limit movement of the fiber guides 26 within the reinforcement channel 46.

In this manner, when a user decides to pivotally flip one of the trays 16 to an open configuration, the guides 26 stay within the reinforcement channels 46 and the outer ends 24 of the tray edge 22 are limited from deflection so as to limit warping of the trays and eventual fiber breakage. For each of the trays 16, the fixture 14 also defines a stop surface 52 adjacent each outer end 24 of the tray 16. The stop surfaces 52 are configured to contact the neck portions 32 to provide positive stops during the pivotal motion of the trays 16.

Thus, the optical fiber management system 10 of the present disclosure that is cooperatively formed by a combination of portions of the flip trays 16 and portions of the fixtures 14 to which they are mounted limit deflection of the trays 16 and provide secured fiber movement and rotation during pivotal movement of the trays 16.

It should be noted that the depicted embodiments of the flip trays 16 and the telecommunications fixture in the form of the enclosure 14 used to show the inventive aspects of the optical fiber management system 10 of the present disclosure are exemplary embodiments, and the inventive aspects may be employed on other types of trays and fixtures.

The above specification, examples and data provide a complete description of the manufacture and use of the composition of the inventive aspects. Since many embodiments of the disclosure can be made without departing from the spirit and scope of the disclosure, the inventive aspects reside in the claims hereinafter appended.

LIST OF REFERENCE NUMERALS AND CORRESPONDING FEATURES

10 Optical fiber management system
12 Optical fiber distribution system
14 Telecommunications fixture/enclosure
16 Flip tray
18 Hinge structure
20 Center
22 Tray edge
24 Outer end
26 Fiber guide 28 Open end
30 Slit
32 Neck portion
34 Fiber entry/exit area/channel
36 Fiber entry/exit point of tray
38 Fiber management finger
40 Longitudinal axis of fiber guide
42 Longitudinal/pivotal axis of hinge structure
44 Cable exit/entry channel of fixture
46 Reinforcement channel
48 U-shaped wall
50 Vertical wall portion
52 Stop surface

What is claimed is:

1. An optical fiber management system comprising:
a telecommunications fixture;
a telecommunications tray pivotally mounted to the telecommunications fixture via a hinge structure positioned at an edge of the tray, wherein the telecommunications tray further defines at least one fiber guide at the edge of the tray that is spaced from the hinge structure, the at least one fiber guide having open ends for guiding fibers in and/or out of the tray, wherein the tray defines a neck portion extending from a main body of the tray to the at least one fiber guide, the neck portion configured to cooperatively form a positive stop with a portion of the telecommunications fixture during pivotal movement of the tray.

2. A system according to claim 1, wherein the telecommunications tray defines two of the fiber guides at the edge of the tray that are spaced from the hinge structure, wherein each fiber guide is nested within a reinforcement channel defined by a generally U-shaped wall of the telecommunications fixture.

3. A system according to claim 2, wherein both fiber guides define longitudinal axes that are generally parallel to a pivotal axis of the hinge structure.

4. A system according to claim 3, wherein the longitudinal axes defined by the fiber guides are generally aligned with the pivotal axis of the hinge structure.

5. A system according to claim 2, wherein the hinge structure is generally positioned at a center point along the tray edge in between the two fiber guides.

6. A system according to claim 1, wherein the at least one fiber guide defines a longitudinal axis that is generally parallel to a pivotal axis of the hinge structure.

7. A system according to claim 6, wherein the longitudinal axis defined by the at least one fiber guide is generally aligned with the pivotal axis of the hinge structure.

8. A system according to claim 1, wherein the at least one fiber guide generally defines a split-ring configuration defining a slit for receiving fibers along a direction transverse to the open ends.

9. A system according to claim 1, wherein the telecommunications fixture is configured to house a plurality of the trays.

10. A flip tray for pivotal mounting in a telecommunications fixture, the flip tray configured for housing optical fibers, the tray comprising:
a hinge structure positioned along an edge of the tray for pivotal mounting to the fixture;
at least one fiber guide positioned at the edge of the tray spaced from the hinge structure, the at least one fiber guide defining open ends for guiding fibers in and/or out of the tray, wherein the tray defines a neck portion extending from a main body of the tray to the at least one fiber guide, the neck portion configured to cooperatively form a positive stop with a portion of the telecommunications fixture during pivotal movement of the tray.

11. A tray according to claim 10, wherein the flip tray comprises a pair of fiber guides positioned at the edge of the tray spaced from the hinge structure, wherein the hinge structure is generally positioned at a center point along the tray edge in between the two fiber guides such that the fiber guides are generally equally spaced from the hinge structure.

12. A tray according to claim 11, wherein longitudinal axes defined by the fiber guides are generally parallel to the pivotal axis of the hinge structure.

13. A tray according to claim 12, wherein the longitudinal axes defined by the fiber guides are generally aligned with the pivotal axis of the hinge structure.

14. A tray according to claim 10, wherein the at least one fiber guide generally defines a split-ring configuration defining a slit for receiving fibers along a direction transverse to the open ends.

15. A tray according to claim 10, wherein the tray is configured to contain fiber optic splices.

* * * * *